Nov. 11, 1969     P. CLEMENT ET AL     3,477,950
DEVELOPING METHOD AND APPARATUS FOR THIN LAYER CHROMATOGRAPHY
Filed Sept. 5, 1967     2 Sheets—Sheet 1

PIERRE CLEMENT
JEAN-MARIE GOMBERT
RENE' PETIT
INVENTORS

BY
ATTORNEYS

United States Patent Office 3,477,950
Patented Nov. 11, 1969

3,477,950
DEVELOPING METHOD AND APPARATUS FOR
THIN LAYER CHROMATOGRAPHY
Pierre Clement, Jean-Marie Gombert, and René Petit, Vincennes, France, assignors to Eastman Kodak Company, Rochester, N.Y., a corporation of New Jersey
Filed Sept. 5, 1967, Ser. No. 665,474
Claims priority, application France, Nov. 14, 1966, 83,447
Int. Cl. B01d 15/08
U.S. Cl. 210—31   5 Claims

ABSTRACT OF THE DISCLOSURE

Apparatus for developing a chromatographic sheet comprising a vessel for holding a solvent, and a cell resting on the rim of the vessel for enclosing the sheet.

The cell may be formed by a pair of matching plates which project upwardly from the vessel and which hold the sheet therebetween for thin layer chromatography.

The vessel desirably has two compartments for solvent with a partition separating them.

The cell also may be a cover carrying two electrodes which dip one into each compartment, for electrophoresis. In this embodiment the chromatographic sheet is bowed so that each end dips into a different compartment.

---

The present invention relates to a novel method of and apparatus for conducting thin layer chromatographic analyses.

Thin layer chromatography is a modern laboratory process which has acquired great importance because of the ease and rapidity of analysis of complex mixtures of organic compounds. This procedure was originally performed by depositing a layer of an adsorbent material on a rigid glass plate which was then dipped into a solvent in order to effect the separation of the various components of the mixture which had been spotted on the layer.

Recently, a substantial improvement in the classical process has been devised using very thin flexible sheets to carry the thin adsorbent layer, instead of rigid relatively thick glass plates. French Patent 1,411,722 describes examples of a flexible thin sheet of a synthetic polymer such as polystyrene, polyamides, polyolefins, cellulose triacetate, and polyesters, onto which a thin layer of an absorbent material is applied, for example, silica, alumina, polycarbonates, polyamides, cellulose derivatives, or ion exchange resins. (The word "absorbent" will be applied therein to describe such substances, and will also designate compounds which are only adsorbent.)

One of the principal problems involved in using thin flexible plastic sheets as supports of the chromatographic layers is that the thinness of the absorbent layer on a flexible support renders it more sensitive to variations of vapor pressure of the solvent than the thicker layers on glass plates. When a chromatographic sheet is placed in a solvent-saturated atmosphere, the sheet fixes a substantial amount of solvent vapor, which limits the ascent of the solvent in the absorbent layer and is detrimental to the quality of the separation. Conversely, when the flexible sheet is placed in an atmosphere which is not saturated with solvent vapor, there occurs an evaporation of solvent from the chromatographic layer which disturbs the ascent of the solvent and is detrimental to the reproducibility of chromatographic separations.

These problems are difficult to solve, but interesting results have been obtained by placing a thin chromatographic sheet between two glass or plastic plates defining a narrow chamber which permits only a limited volume of solvent vapor to be in contact with the chromatographic layer. However, when the thin chromatographic sheet is sandwiched between two supporting plates and the sandwich is dipped into a pool of solvent liquid, the liquid not only migrates through the absorbent layer in the desired manner, but also tends to flow rapidly through the thin space between the sheet and the support plates by capillary action. This causes flooding which is detrimental to the analysis.

The disadvantages discussed above have been overcome by our novel chromatographic apparatus and method of chromatographic analysis wherein a thin flexible sheet is supported by at least one support member, such as a glass plate that is applied upon the active chromatographic surface, with the thin sheet projecting a substantial distance (for example, a few dozen millimeters) beyond the edge of the support member on at least one side. Thus, the apparatus can be positioned with the projecting portion of the sheet partially immersed in a solvent bath, while the support member itself is spaced from the surface of the bath. In this way a portion of the sheet is in contact with the air between the liquid solvent surface and the support plate, and solvent does not come into contact with the support plate, thus eliminating flow of liquid by capillary action . In order to further avoid capillary action, and also to provide vapor laden chambers of limited volume adjacent to the absorbent layer of the sheet, the support member is provided with grooves or transverse corrugations formed by transverse ridges. When the chromatographic sheet is applied against these corrugations, a series of micro chambers is formed containing an atmosphere having a well-defined vapor pressure. The chambers are practically saturated with vapor where the solvent has ascended, but are free from solvent vapor where the solvent has not ascended. At the same time the sheet is adequately supported by the peaks of the ridges.

The new apparatus for chromatographic analysis according to the invention comprises a tank containing a chromatographic solvent, and a cell is placed above the tank for the purpose of receiving a chromatographic sheet, said sheet open in its lower portion, particularly characterized in that it comprises at least one partition and one device assuring close contact between said partition and the active chromatographic sheet, or support device.

According to another characteristic of the invention, the lower portion of said partition is placed above the free level of the solvent contained in the tank.

The cell, as well as the tank of the chromatographic apparatuses according to the invention are advantageously made of glass, because it is a material inert to most solvents and transparent, thus permitting the observation of the chromatographic analysis. However, it is also possible to use a transparent plastic material resistant to the chromatographic solvents, or else the support device and/or the tank may be made of a resistant metal such as stainless steel.

In addition to the foregoing advantages, the specific novel design of apparatus in accordance with this invention is distinguished by its extreme simplicity because only two or three parts are needed for supporting the chromatographic sheet and conducting the analysis. In one embodiment these three parts are (1) a container for the solvent liquid having a rim, (2) a support plate extending at an acute angle to the horizontal, and having a horizontal base or foot projecting therefrom far enough to provide stability and resting on a part of the rim; and (3) a protective cover plate extending at an obtuse angle to the horizontal, having a surface substantially co-extensive with the support plate, and having a horizontal base surface which rests on the rim. The protective cover plate is adapted to rest against the top surface of a chromatographic sheet to hold it in position by gravity against the support plate. In another embodiment there are only a solvent container and a cover therefor.

The details of the apparatus and method will become more apparent from the following description having reference to the accompanying drawings wherein.

Figure 1:
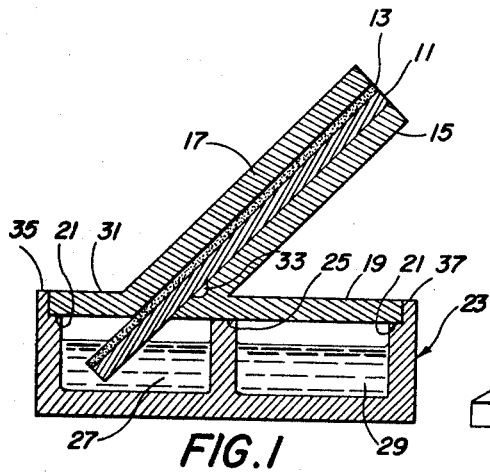
FIG. 1 is a vertical sectional view through one form of chromatographic apparatus in accordance with the invention, showing a chromatographic sheet held in position by a support plate and a protective plate inclined to the horizontal.
Figure 2:
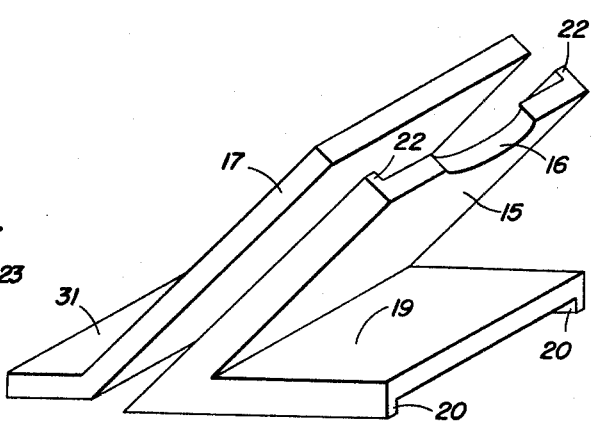
FIG. 2 is a perspective view showing the support plate and the protective plate of FIG. 1.
Figure 3:
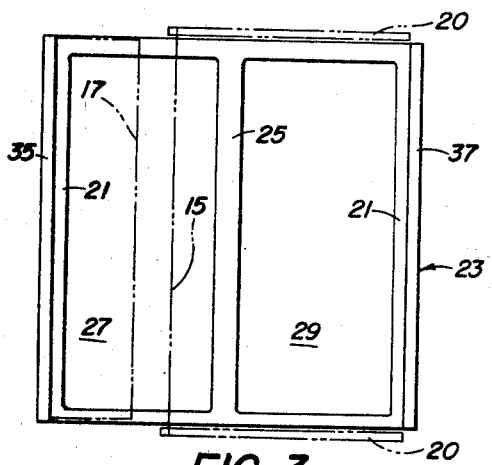
FIG. 3 is a plan view of the solvent container as seen from the top in FIG. 1, the support plate and protective plate being omitted.

Referring to FIGS. 1, 2 and 3, a flexible thin chromatographic sheet 11 having a layer 13 of absorbent material on one side is sandwiched between a support plate 15 and a protective plate 17, both of which have plane surfaces. Support plate 15 extends at an acute angle to the horizontal, has a horizontal base or foot 19 which projects therefrom a distance sufficient to assure stability, and has a bottom surface which rests upon a portion of the rim 21 of the container or tank 23 and also rests on the top edge of a partition 25 which divides the container 23 into two compartments 27 and 29. An arcuate finger hole 16 aids in separating the parts.

Downwardly extending flanges 20 on base 19 are adapted to fit over the sides of container 23, and upwardly extending flanges 22 are adapted to fit over the sides of plate 17, to restrict sideways movement and to assure tight seals.

The protective plate 17 extends at an obtuse angle to the horizontal parallel to plate 15, and is heavy enough to hold the chromatographic sheet in position simply by its weight. At its lower end plate 17 comprises a horizontal base or foot 31 having a base surface which rests upon the remainder of the rim 21 not occupied by the support plate 15 to assure a vapor-tight and air-tight seal around the entire periphery of the container 23.

The chromatographic sheet 11 projects down from between the two plates 15 and 17 and dips into a pool of solvent liquid in the compartment 27. The pool surface is spaced sufficiently below the bottom surfaces of the plates 15 and 17 to avoid liquid contact at the sheet-plate interfaces, whereby capillary flow is avoided. Capillary flow is also prevented by providing a transverse groove 33 in the upper surface of plate 15 a short distance above its bottom edge to block the flow of any liquid which might have accumulated as a result of vapor condensation at the interface.

In order to prevent the plates 15 and 17 from moving out of position, two sides of the container 23 are provided with upstanding flanges 35 and 37 which form shoulders for the bases 19 and 31 to prevent sideways movement, and also further to improve the seal between the container and the plates.

FIG. 3 shows the container 23 alone, but with the positions of the support plate 15 and the protective plate 17 indicated in dash lines to show how they cooperate to provide a tight seal completely around the periphery of the container. The container is symmetrical so that the chromatographic unit can be positioned thereon facing as in FIG. 1, or 180° therefrom.

Figure 4:
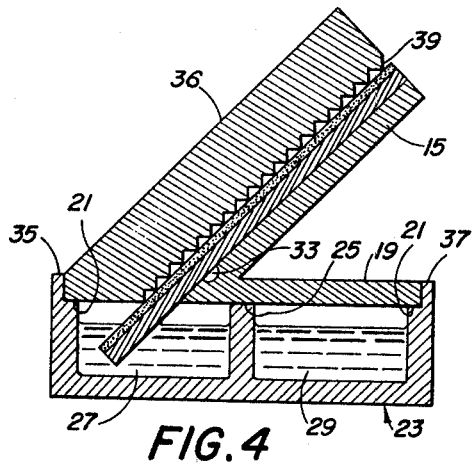
FIG. 4 is a vertical sectional view through a chromatographic apparatus similar to FIG. 1, but with a modified design of the protective plate.

Referring to FIG. 4, the embodiment there shown is the same as described in connection with FIGS. 1 and 2 except that a heavier protective plate 36 of much thicker cross section is provided so that the need for a projecting foot 31 to assure coverage of the container is eliminated. Additionally, the bottom surface of the protective plate 36 is provided with a series of protuberances in the form of transverse ridges or corrugations 39 which extend across the entire plate width, in contact with the chromatographic sheet, and form vapor chambers the atmosphere of which has a well defined solvent vapor pressure, and which at the same time make it possible to reduce the vaporization of solvent from the absorbent layer to a minimum so as to practically eliminate any adverse effects on the analysis which might be caused by excessive vaporization. Of course, similar corrugations can be provided on the plate 17 of FIG. 1.

Figure 5:
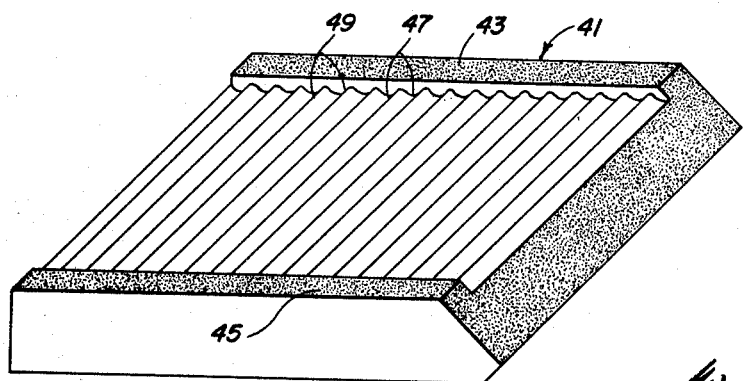
FIG. 5 is a perspective view showing details of a still further modified form of protective plate.

Referring to FIG. 5, there is shown another embodiment of a protective plate 41 which is similar to the plate 36 of FIG. 4 except that the major portion of the plate is recessed below the surface of two side boundary portions 43 and 45 so as to provide a thin chamber to receive the chromatographic sheet when the protective plate is in cooperative relationship with a support plate. The boundary portions 43 and 45 are ground or otherwise made flat, and are adapted to be contiguous to the surface of the support plate so as to prevent the access of air or the leakage of solvent vapor through the sides of the apparatus.

The floor 47 of the protective plate 41 comprises a plurality of transversely extending parallel ridges 49 which provide vapor chambers therebetween as described in connection with FIG. 4. The peaks of the ridges are recessed below the edge surfaces 43 and 45 by approximately the thickness of a chromatographic sheet.

An important advantage of the present invention is that it is readily adaptable to the conducting of successive developing operations using different liquid solvents. Referring to FIG. 1, after the chromatographic sheet 11 has been developed in the solvent in chamber 27, subsequent developing can be accomplished by lifting plates 15 and 17, together with the sheet 11 as a unit, rotating the unit 180° relatively to the tank 23, and replacing it so that the sheet 11 then dips into the solvent pool 29. Obviously the same result can be accomplished by lifting the unit and rotating the tank instead of the unit.

Sometimes it is desirable to have a different edge of the chromatographic sheet dipping into the solvent liquid for the second developing operation and for effecting a cross chromatography, and this is accomplished simply by separating the two plates 15 and 17, rotating the sheet 11 therein until the proper edge projects from the ends of the plates by the desired length, and then replacing the unit so that the new edge dips into the solvent in either the chamber 27 or 29, as desired.

Figure 6:
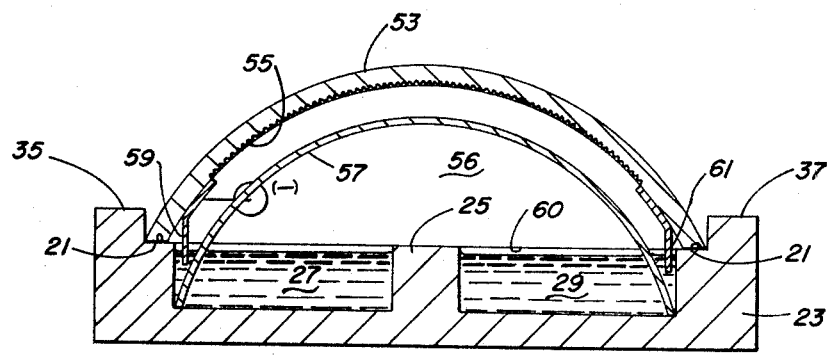
FIG. 6 is a vertical sectional view through a modified form of apparatus for chromatography by electrophoresis.
Figure 7:
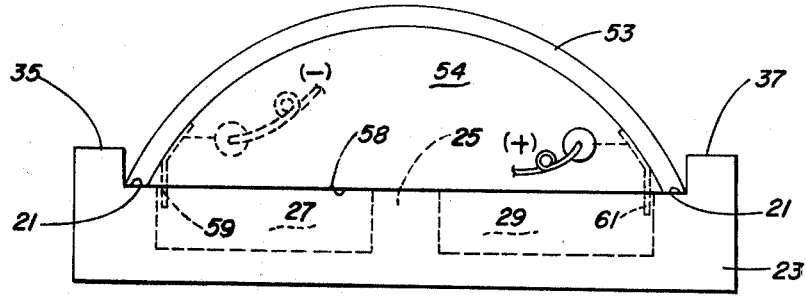
FIG. 7 is an end elevational view of the apparatus of FIG. 6.

The chromatographic tank 23 having two compartments 27 and 29 shown in FIGS. 1 and 3 may easily serve as an electrophoresis tank, onto which a special electrophoresis cell is adapted. Referring to FIGS. 6 and 7, this cell displays the essential characteristics of the invention and comprises a cover formed by a shell 53 and a support arrangement closing the ends of the shell, between which a chromatographic sheet is inserted. This shell 53 is, for example, in the shape of a concave plate; it may have on its inner surface horizontal ridges 55 and rests on the shoulders 21 of tank 23. The chromatographic sheet 57 is curved inwardly and arranged so that several millimeters of its ends dip into each of the compartments 27 and 29. A support arrangement comprises a pair of semi-cylindrical plates 54, 56 closing opposite ends of shell 53, each plate being closed at its base and resting on the two sides 58, 60 of the tank 23 which are not provided with shoulders 21 and on the upper part of the partition 25 which separates the two compartments 27 and 29. Each support plate has an outer diameter slightly smaller than the inner diameter of said semi-cylindrical shell 53, so that said chromatographic sheet may be applied advantageously with its active surface, on said semi-cylindrical shell. Two electrodes 59, 61 are fixed on opposite sides of shell 53 which dip, respectively, into the two compartments 27 and 29 for a distance only slightly less than the width of the compartments.

In operation, the active coating on sheet 57 is wet throughout with the buffer solution used in compartments 27 and 29, the substance to be analyzed is placed on the center of the sheet 57, the cover is placed over the sheet and direct current is applied to the electrodes 59, 61. This causes some components of the sample to migrate toward the positive electrode and some toward the negative electrode. The principles of electrophoresis are well known, for example, in the publication Laboratory Practice, vol. 15, No. 6, page 653 et seq. Among suitable buffers solutions are formic acid plus acetic acid, sodium borate, and pyridine plus acetic acid.

From the foregoing description it is apparent that the apparatus and method are especially suitable for performing chromatography wherein a substance to be analyzed is spotted on an absorbent layer carried on a flexible thin sheet which is then dipped in a solvent bath. Improved separations and improved reproducibility are obtained as a result of elminating capillary flow and reducing to a minimum the evaporation and fixation phenomena.

The main advantages brought by the invention are, on the one hand, a more reproducible separation which is particularly evident with an Rf of each separate more reproducible substance and, on the other hand, by a more reproducible speed increase of the solvent.

Moreover, the device is simple and inexpensive in construction, and readily adaptable to several different types of chromatographic separations such as simple one-step separations, separations using several successive solvents, cross chromatography, or different types of separations without changing the solvents, ascending or descending chromatographs.

We claim:
1. A method for conducting a chromatographic analysis wherein two different solvent liquids are used successively to develop a chromatographic sheet, said method comprising:
   providing a container having two separate compartments therein, each containing a different solvent liquid;
   positioning on the top of said container a chromatographic sheet support having a thin flexible chromatographic sheet sandwiched between two support plates, with the lower end portion of said sheet projecting from said support plates and dipping into one of said solvent liquids;
   developing samples spotted on said sheet;
   upon completion of said developing step, removing said support plates and the chromatographic sheet from the top of said container, rotating said plates with respect to said container and replacing said plates on said container with said chromatographic sheet therebetween and dipping into the solvent liquid in the other compartment;
   and further developing said chromatographic sheet.
2. A chromatographic apparatus comprising
   a container for solvent liquid, said container having a bottom, a raised rim and a partition defining two separate compartments for holding pools of solvent liquid,
   a support plate for supporting a chromatographic sheet with one end thereof extending into one of said compartments, said support plate extending at an acute angle to the plane of said rim and having a base portion resting on said rim and covering a major portion of said container, and
   a protective plate substantially coextensive with and positioned opposite to said support plate to provide space for said chromatographic sheet therebetween, said protective plate resting on said rim and covering the remaining portion of said container.
3. A chromatographic apparatus as described in claim 2 where said support plate has a transverse groove therein in proximity to said container for blocking the capillary flow of solvent liquid along said chromatographic sheet.
4. A chromatographic apparatus as described in claim 3 wherein said protective plate includes a plurality of spaced protuberances on its surface for contacting the active surface of said chromatographic sheet.
5. A chromatographic apparatus as described in claim 4 wherein said protuberances are transverse ridges.

UNITED STATES PATENTS

| | | | |
|---|---|---|---|
| 3,318,451 | 5/1967 | Przybylowicz et al. | 210—198 |
| 3,327,857 | 6/1967 | Kopp | 210—198 |

OTHER REFERENCES

Heftmann, Erich, Chromatography, 1961, Reinhold Publishing Co. New York, page 260.

Schaar and Company, Chromatography, 1956, Catalog AC-56, Chicago, page 22.

JAMES L, DECESARE, Primary Examiner

U.S. Cl. X.R.

210—198